United States Patent
Gummow

(10) Patent No.: US 7,975,573 B2
(45) Date of Patent: Jul. 12, 2011

(54) HAND TOOL WITH STEPLESS LOCKING MECHANISM

(76) Inventor: Stephen A. Gummow, Rockton, IL (US)

( * ) Notice: Subject to any disclaimer, the term of this patent is extended or adjusted under 35 U.S.C. 154(b) by 172 days.

(21) Appl. No.: 12/418,310

(22) Filed: Apr. 3, 2009

(65) Prior Publication Data

US 2010/0252385 A1 Oct. 7, 2010

(51) Int. Cl.
*B25B 13/46* (2006.01)
*F16D 41/08* (2006.01)

(52) U.S. Cl. ............................................. 81/58; 192/43

(58) Field of Classification Search ............. 81/58, 58.4, 81/60; 192/43, 44
See application file for complete search history.

(56) References Cited

U.S. PATENT DOCUMENTS

| | | | |
|---|---|---|---|
| 1,050,757 A * | 1/1913 | Annable et al. ................. | 192/44 |
| 1,936,640 A | 11/1933 | Pfauser | |
| 1,981,526 A * | 11/1934 | Rueb ................................. | 81/63 |
| 2,119,622 A | 6/1938 | Freber | |
| 2,351,996 A * | 6/1944 | Morgan ........................ | 192/54.5 |
| 2,469,572 A | 5/1949 | Pratt | |
| 2,542,323 A * | 2/1951 | Gearhart ........................... | 192/43 |
| 2,565,961 A * | 8/1951 | Godfrey ........................... | 192/43 |
| 2,834,239 A | 5/1958 | Mancini | |
| 3,019,872 A | 2/1962 | Morris et al. | |
| 3,444,767 A | 5/1969 | Cupler | |
| 4,669,339 A | 6/1987 | Cartwright | |
| 4,884,478 A | 12/1989 | Lieser | |
| 4,924,737 A | 5/1990 | Gummow | |
| 5,136,901 A | 8/1992 | Williams | |
| 5,199,329 A * | 4/1993 | Hsu ................................. | 81/59.1 |
| 5,269,207 A | 12/1993 | Kutzler | |
| RE34,680 E | 8/1994 | Lieser | |
| 5,351,583 A * | 10/1994 | Szymber et al. .................. | 81/60 |
| 5,404,773 A | 4/1995 | Norville | |
| 5,499,559 A * | 3/1996 | Lin ................................. | 81/59.1 |
| 5,943,921 A | 8/1999 | Lin | |
| 6,044,944 A | 4/2000 | Adams et al. | |
| 6,067,881 A | 5/2000 | Albertson | |
| 6,116,119 A | 9/2000 | Williams | |
| 6,209,422 B1 | 4/2001 | Kamiya et al. | |
| 6,276,239 B1 * | 8/2001 | Albertson ...................... | 81/59.1 |
| 6,357,323 B2 * | 3/2002 | Chi et al. ........................... | 81/60 |
| 6,575,058 B1 * | 6/2003 | Mitchell ........................ | 81/59.1 |
| 7,036,400 B2 * | 5/2006 | Matsumoto et al. ........... | 81/59.1 |
| 2003/0015386 A1 * | 1/2003 | Gummow ....................... | 192/43 |
| 2006/0102442 A1 * | 5/2006 | Dein ............................... | 192/44 |
| 2006/0108194 A1 * | 5/2006 | Phillips .......................... | 192/44 |
| 2007/0163398 A1 * | 7/2007 | Lai Lee .......................... | 81/59.1 |

* cited by examiner

*Primary Examiner* — David B Thomas
(74) *Attorney, Agent, or Firm* — Banner & Witcoff, Ltd.

(57) ABSTRACT

A ratchet mechanism contains a chamber defined by at least one gear surface, a rotating member positioned at least partially within the chamber, a gear member rotatably attached to the rotating member and positioned at least partially within the chamber, and a stop member engaging the rotating member, such that the rotating member and the stop member rotate in unison. The center of rotation of the gear member is offset from the center of rotation of the rotating member. The gear member includes a gear body having a plurality of gear teeth around an outer periphery thereof. At least a portion of the gear teeth engage the gear surface. The gear member can rotate freely in a first rotational direction, and a portion of the stop member abuts a portion of the gear member to prevent rotation of the gear member in a second, opposed rotational direction.

31 Claims, 6 Drawing Sheets

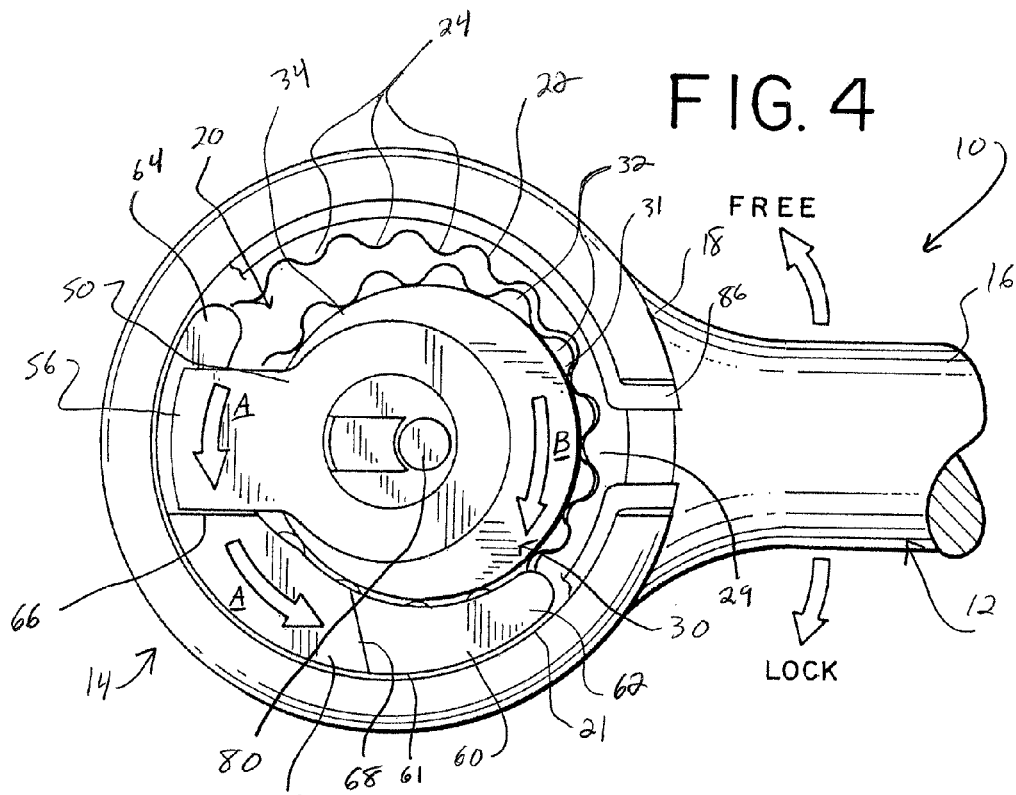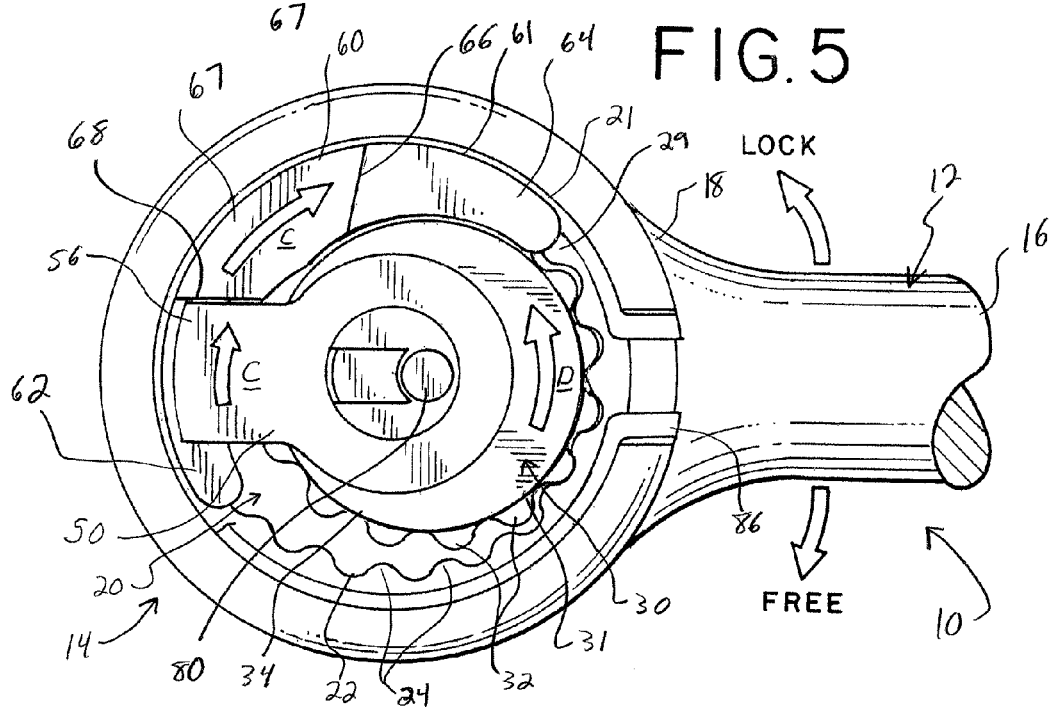

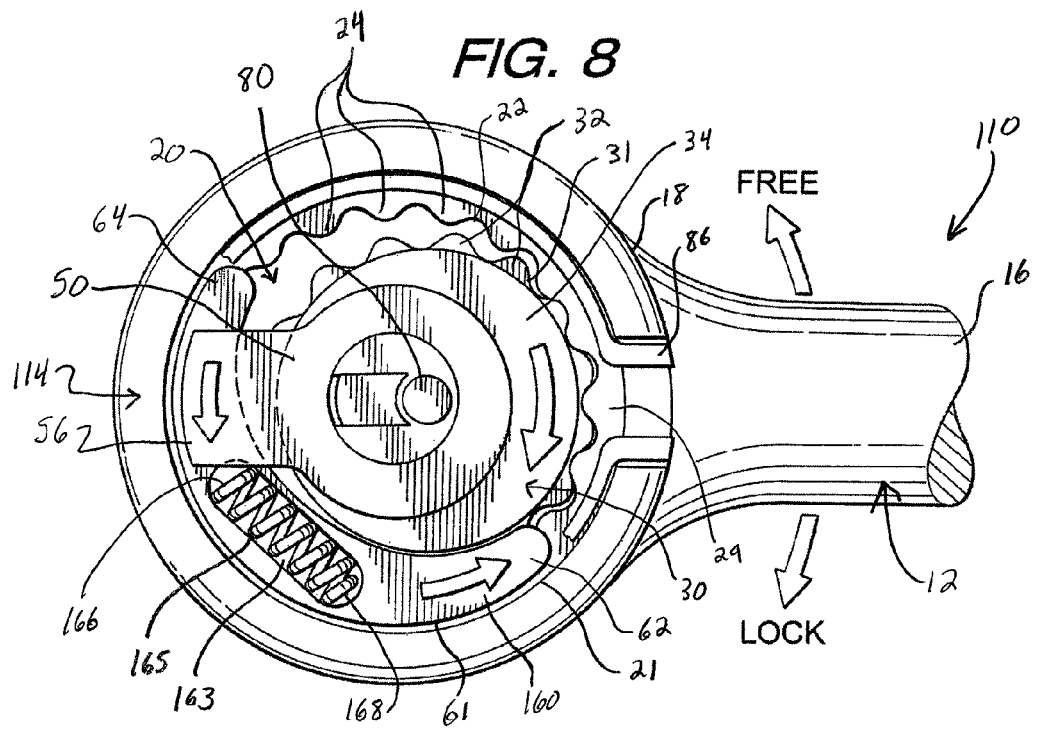
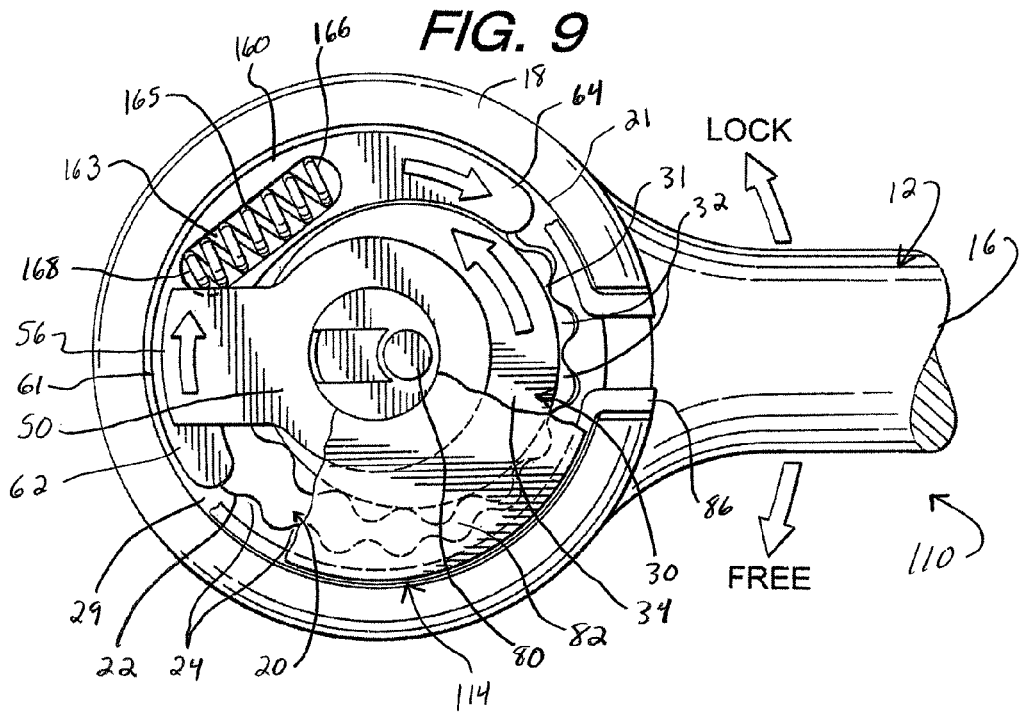

HAND TOOL WITH STEPLESS LOCKING MECHANISM

TECHNICAL FIELD

The invention relates to a hand tool having a stepless locking rotation mechanism, and more specifically, to a stepless ratchet.

BACKGROUND

A variety of rotational hand tools exist on the market, including ratchets, which are configured to permit free rotation in one direction and to be fixed against rotation in the opposite direction, in order to tighten rotational fasteners, such as screws, bolts, and nuts. However, prior ratchets have certain disadvantages and limitations. For example, the locking mechanisms of prior ratchets do not lock immediately when torque is applied in the locking direction, allowing a certain amount of "play" in the ratchet. When such prior ratchets are used in tight spaces, the confined area may not permit sufficient movement to create locked rotation, preventing the tool from transferring torque to the fastener. Additionally, existing ratchets tend to slip at high levels of torque, and can undergo gradual slippage over time.

The present assembly is provided to solve the problems discussed above and other problems, and to provide advantages and aspects not provided by prior hand tools and ratchet mechanisms of this type. For example, the present assembly provides a ratchet that locks immediately upon rotation in the locked direction, creating enhanced operability, particularly in tight spaces. A full discussion of the features and advantages of the present invention is deferred to the following detailed description, which proceeds with reference to the accompanying drawings.

BRIEF SUMMARY

Aspects of the present invention relate to a ratchet mechanism that includes a chamber defined by at least one gear surface, a rotating member positioned at least partially within the chamber, a gear member rotatably attached to the rotating member and positioned at least partially within the chamber, and a stop member engaging the rotating member, such that the rotating member and the stop member move in unison. The center of rotation of the gear member is offset from the center of rotation of the rotating member. The gear member includes a gear body having a plurality of gear teeth around an outer periphery thereof. At least a portion of the gear teeth engage the gear surface. The gear member can rotate freely in a first rotational direction, and a portion of the stop member abuts a portion of the gear member to prevent rotation of the gear member in a second, opposed rotational direction.

According to one aspect, the gear member rotatably engages the rotating member such that the offset of the first and second centers of rotation causes the gear member to orbit the first center of rotation when the gear member is rotated. Accordingly, in one embodiment, when the gear member is rotated in the first rotational direction, the rotating member rotates in the second, opposed rotational direction.

According to another aspect, the rotating member has a first position and a second position relative to the stop member. When the rotating member is in the first position, the rotating member engages a first surface of the stop member to cause the stop member to move in a first direction, and when the rotating member is in the second position, the rotating member engages a second surface of the stop member to cause the stop member to move in a second direction. In one embodiment, the rotating member is adjustable between the first and second positions relative to the stop member by rotating the rotating member relative to the stop member. In another embodiment, a removable pin connects the rotating member to the gear member, and the removable pin is removed to adjust the rotating member between the first position and the second position relative to the stop member. In another embodiment, the stop member includes a spring, and the first and second surfaces of the stop member are defined on opposed ends of the spring. The spring may be received in a recess in the body of the stop member.

According to yet another aspect, the chamber is a circular chamber defined within the head of a hand tool, and the gear surface is an annular gear surface positioned around the inner periphery of the circular chamber.

According to a further aspect, the gear member has a journal located adjacent the gear body, and the stop member abuts the journal to prevent rotation of the gear member in the second direction.

According to a still further aspect, the stop member is a wedge shaped stop member having two tapered arms. In one rotational configuration, one of the tapered arms engages the gear member to prevent rotation of the gear member, and in the other rotational configuration, the other of the tapered arms engages the gear member to prevent rotation of the gear member.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 3 is a cross-sectional view of the hand tool of FIG. 1;

FIG. 4 is a top view of the hand tool of FIG. 1 with a cap member removed to show internal detail, shown in a clockwise drive configuration;

FIG. 5 is a top view of the hand tool of FIG. 1 with the cap member removed to show internal detail, shown in a counterclockwise drive configuration;

FIG. 8 is a top view of the hand tool of FIG. 6 with the cap member removed to show internal detail, shown in a clockwise drive configuration; and FIG. 9 is a top view of the hand tool of FIG. 6 with the cap member removed to show internal detail, shown in a counterclockwise drive configuration.

DETAILED DESCRIPTION

Figure 1:
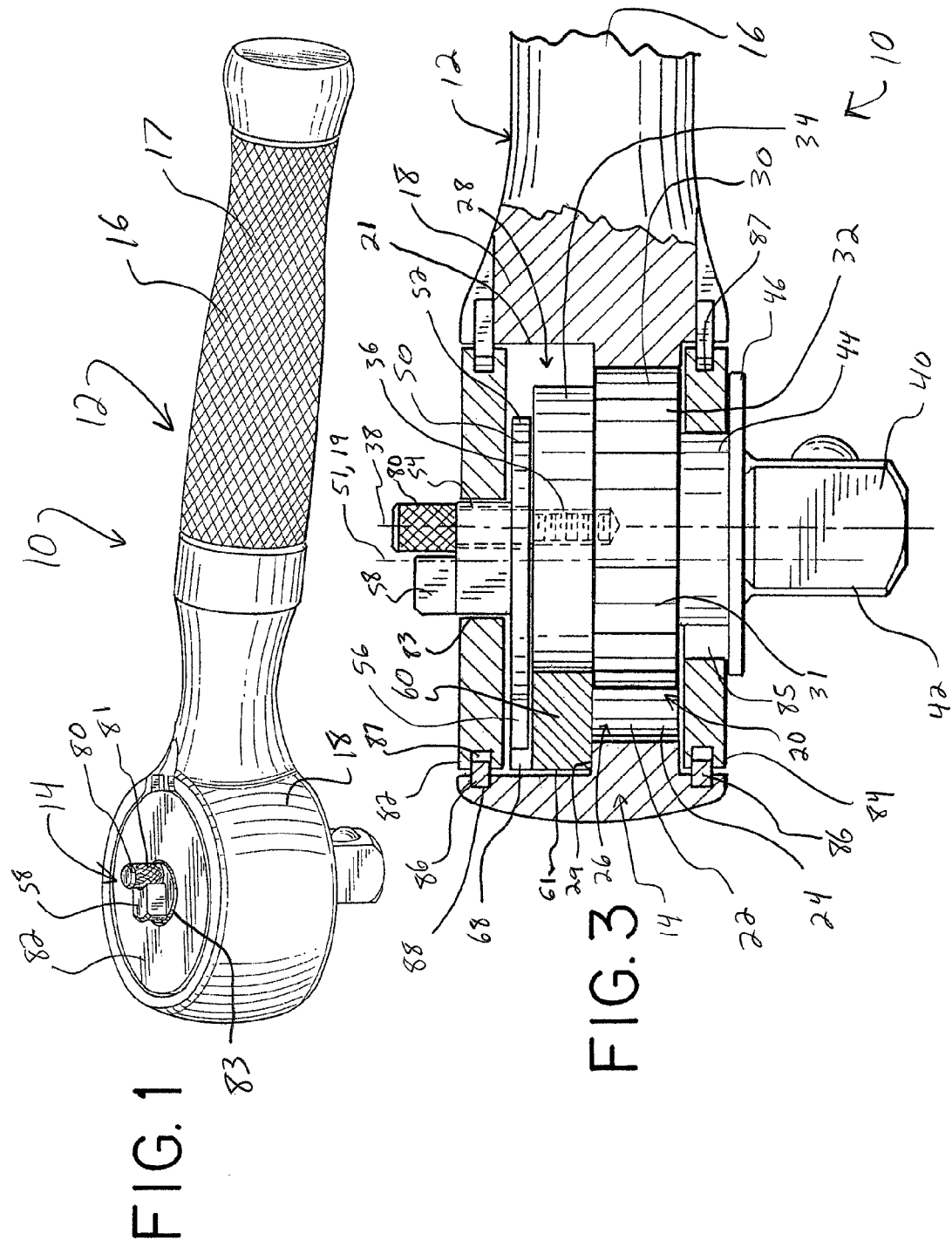
FIG. 1 is a perspective view of one embodiment of a hand tool according to the present invention.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the FIGS., and initially to FIG. 1, there is shown an exemplary embodiment of a hand tool 10. In the embodiment shown in FIG. 1, the hand tool 10 is a ratchet formed of a tool body 12 and a rotation mechanism 14. The tool body 12 includes a handle 16 and a head 18 mounted at an end of the handle 16. The rotation mechanism 14 is contained within the head 18. The ratchet 10 can be selectively set to drive in either a clockwise or counterclockwise direction and to free-wheel when turned in a direction opposite the driving direction. Thus, the ratchet 10 can be used to drive threaded fasteners (not shown) or similar items, and can be set to tighten or loosen such a fastener. It is understood that the rotation mechanism 14 can be incorporated into a different type of tool or mechanism where alternating fixed and free-wheeling rotation are desired.

The handle 16 is elongated and adapted to be gripped and actuated by a user to operate the ratchet 10. The handle 16 of the ratchet 10 of FIG. 1 has a knurled gripping surface 17 to facilitate gripping of the handle 16. The tool body 12 may be manufactured of stainless steel or another suitable material.

Figure 2:
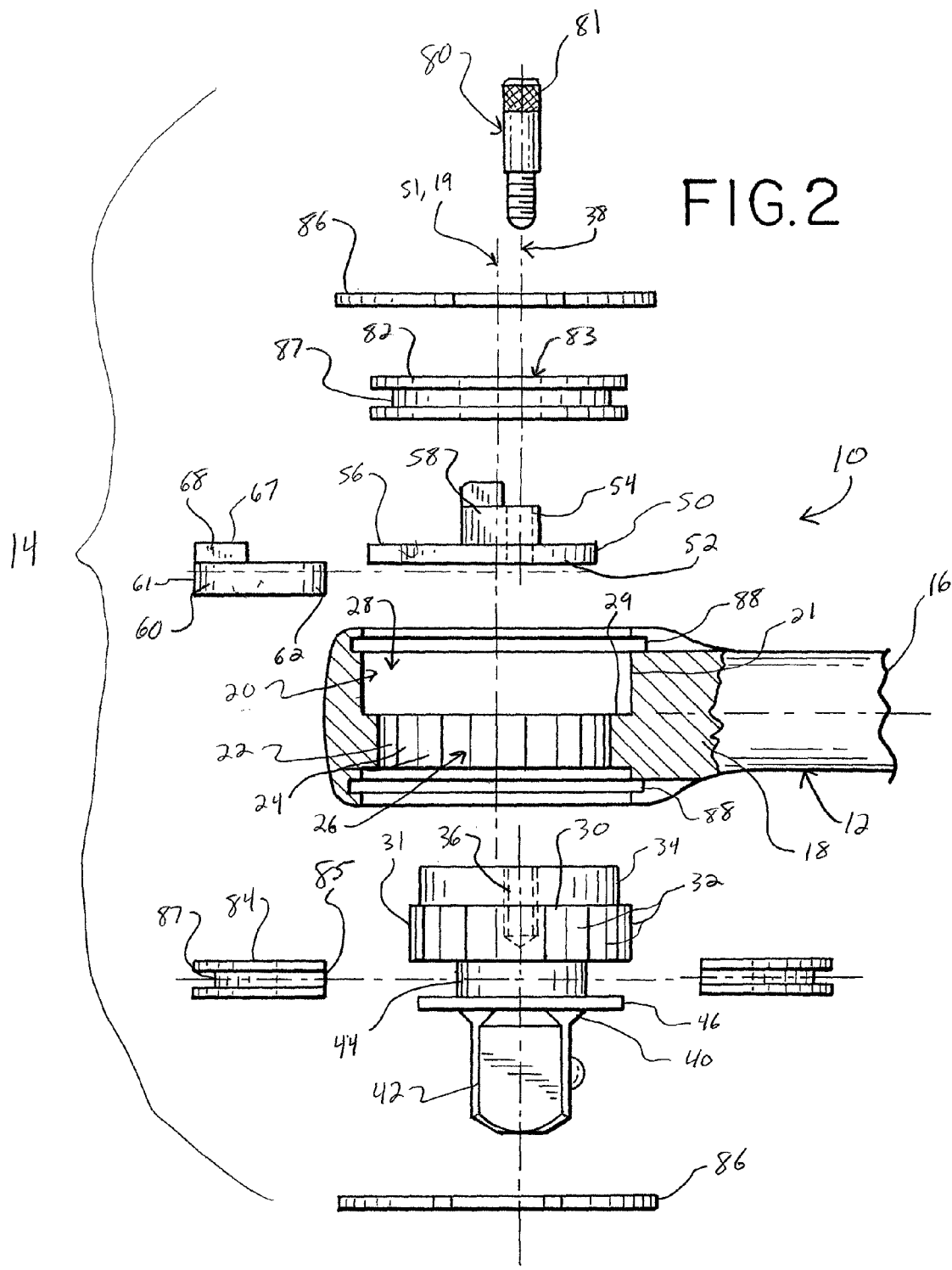
FIG. 2 is an exploded view of the hand tool of FIG. 1.
Figure 6:
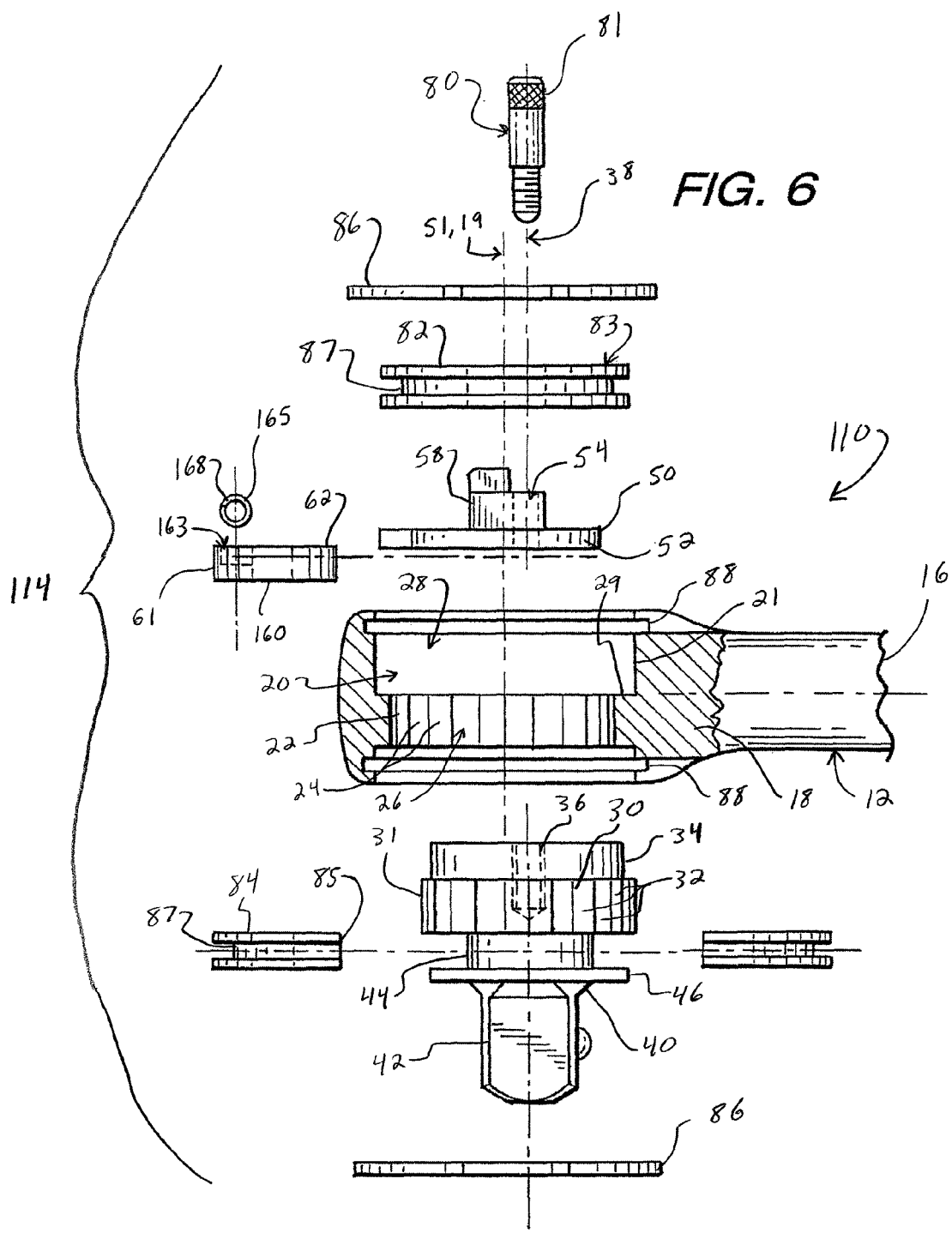
FIG. 6 is an exploded view of a second embodiment of a hand tool according to the present invention.
Figure 7:
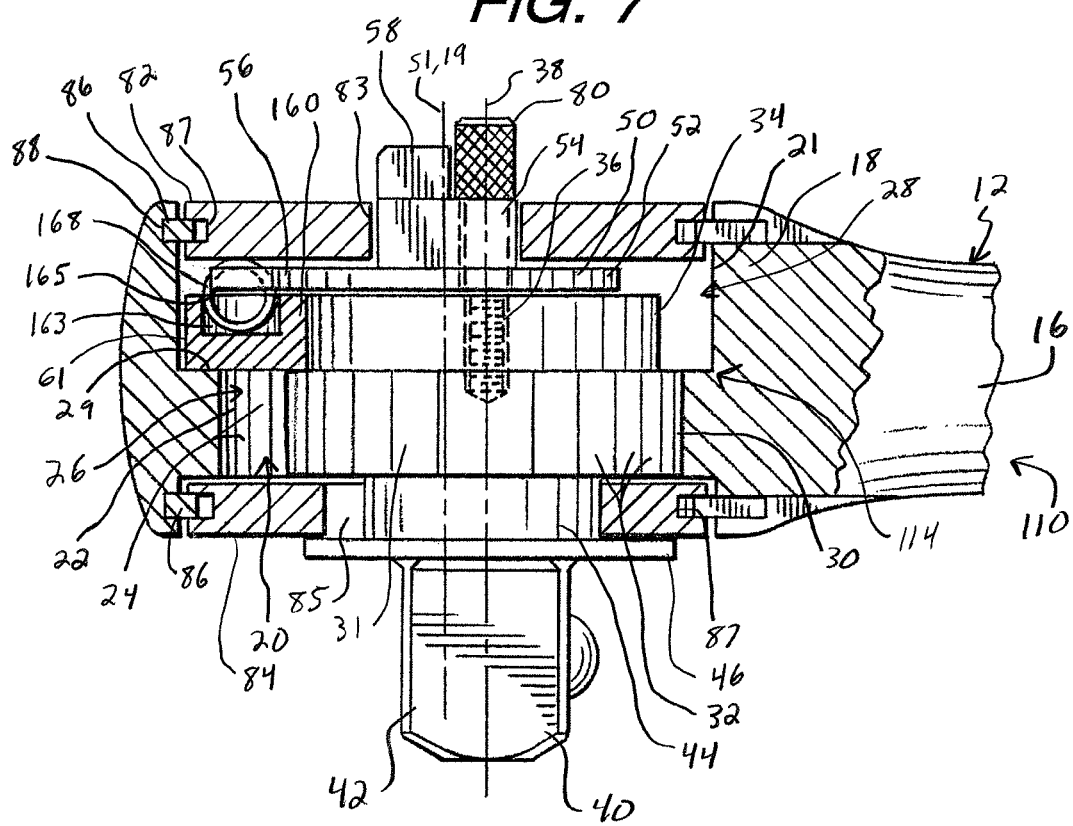
FIG. 7 is a cross-sectional view of the hand tool of FIG. 6.

In the ratchet 10 shown in FIGS. 1-3, the head 18 is in the form of a circular ring defining a circular chamber 20 with an annular fixed gear surface 22 having a plurality of gear teeth 24 around the inner periphery of a lower portion 26 of the chamber 20. As illustrated in FIGS. 4 and 5, the gear surface 22 has nineteen gear teeth 24, but other embodiments may contain a different number of gear teeth 24. In the embodiment shown in FIGS. 2-5, the chamber 20 also includes a smooth, cylindrical chamber wall 21 in an upper portion 28 of the chamber, located adjacent the lower portion 26 with the gear surface 22. As shown in FIGS. 2-3, the upper portion 28 of the chamber is wider than the lower portion 26, forming a shelf 29.

The head 18 supports the rotation mechanism 14, and the components of the rotation mechanism 14 are generally contained wholly or partially within the chamber 20. As shown in FIGS. 2 and 3, the rotation mechanism 14 generally has several moving parts, including an inner gear member 30, a stub member 40, a rotating member 50, and a stop member 60. Additionally, the rotation mechanism 14 shown in FIGS. 2 and 3 contains a removable pin 80, top and bottom cap members 82, 84, and retaining members 86.

The inner gear member 30 is generally cylindrical and has a gear body 31 with plurality of gear teeth 32 positioned around the outer periphery thereof. In one exemplary embodiment, as illustrated in FIGS. 4-5, the gear member 30 has fifteen gear teeth 32, but other embodiments may have a different number of gear teeth 32. The gear member 30 also has a journal 34 projecting from one side, and the journal 34 has a hole 36 therein that receives the removable pin 80, as described in greater detail below. The journal 34 shown in FIGS. 2-5 has cylindrical shape with a smooth outer surface. The gear member 30 has an axis of rotation 38 that is aligned approximately with the threaded hole 36 in the journal 34.

The stub member 40 has an attachment member 42 adapted to be connected to a tool attachment (not shown), such as a socket. The stub member 40 is connected to the gear member 30 so that the gear member 30 and the stub member 40 rotate in unison. In one exemplary embodiment, as illustrated in FIGS. 2 and 3, the stub member 40 is integrally connected to the gear member 30, so that the stub member 40 and the gear member 30 form a single, integral piece. A narrowed neck portion 44 connects the stub member 40 to the gear member 30, and a widened flange 46 is located adjacent the neck portion 44, in the embodiment shown in FIGS. 2 and 3. In other embodiments, the stub member 40 and the gear member 30 may be separate pieces.

The rotating member 50 is rotatably attached to the gear member 30. In other words, the rotating member 50 and the gear member 30 are connected, but can rotate with respect to each other. In the embodiment illustrated in FIGS. 2-5, the rotating member 50 includes a horizontal plate body 52 having a passage 54 therethrough and an engagement member 56 extending therefrom. The passage 54 receives the removable pin 80 therethrough to rotatably connect the rotating member 50 to the gear member 30. The engagement member 56, as illustrated, is an arm extending from the plate body 52. Additionally, in the embodiment shown, the rotating member 50 has a projection 58 extending from the top thereof. The projection 58 is adapted to be manipulated by a user to change the position of the rotating member 50 and adjust the ratchet 10 between clockwise drive and counterclockwise drive configurations, as described below. In the embodiment illustrated in FIGS. 2-5, the projection 58 also serves to define the center of rotation for the rotating member 50, as described below.

The stop member 60 may have one of a number of different configurations, depending on the shape of the gear member 30 and the rotating member 40. In the exemplary embodiment illustrated in FIGS. 2-5, the stop member 60 is a crescent-shaped wedge having two tapered arms 62, 64. The stop member 60 also has two opposed engagement surfaces 66, 68 that are adapted to be engaged by the engagement member 56 of the rotating member 50 to move the stop member 60, as described in greater detail below. In the embodiment shown in FIGS. 2-5, the engagement surfaces 66, 68 are defined on opposite ends of a post 67 that extends upward from the top surface of the stop member 60.

The components of an exemplary embodiment of the hand tool 10 and rotation mechanism 14 therefor are assembled as shown in FIGS. 2-5. The gear member 30 is positioned within the chamber 20 of the tool body 12 so that a portion of the teeth 32 of the gear member are engaged with a portion of the teeth 24 of the fixed gear surface 22. The stop member 60 is positioned within the chamber 20 in a gap between the journal 34 and the chamber wall 21. In the embodiment shown in FIGS. 2-5, the stop member 60 sits upon the shelf 29 and within the upper portion 28 of the chamber 20. In this configuration, the outer surface 61 of the stop member 60 remains in contact or close proximity to the cylindrical chamber wall 21 in the upper portion 28 of the chamber 20 throughout the range of motion of the stop member 60. As shown in FIGS. 4-5, the outer surface 61 is curvilinear to cooperate with the cylindrical chamber wall 21. The rotating member 50 is positioned over the top of the journal 34 of the gear member 30 and the removable pin 80 extends through the passage 54 in the rotating member 50 and into the hole 36 in the gear member 30 to rotatably connect the rotating member 50 to the gear member 30. In the embodiment shown, the pin 80 and the hole 36 are complementarily threaded to create a rigid, but releasable connection between the pin 80 and the gear member 30. In other embodiments, the pin 80 may be connected to the rotating member 50 and the gear member 30 in another manner and/or by other means for retaining the pin 80. For example, in one embodiment, the pin 80 and the hole 36 are smooth, and the pin 80 is held within the hole 36 by a friction or interference fit. In another embodiment, the pin 80 may be held in place by a retaining structure, such as a spring, a tab, another pin, etc.

The top cap member 82 is positioned over the rotating member 50 to contain the rotating member 50 and the stop member 60 in the chamber 20. The cap member 82 has a circular aperture 83, and the projection 58 of the rotating member 50 extends through the aperture 83. The aperture 83 and the projection 58 are complementarily shaped and the cap member 82 holds the rotating member 50 in position. The rotating member 50 can rotate about an axis of rotation 51 defined by the projection 58 and the aperture 83, but cannot move laterally. The stub member 40 extends out of the chamber 20, and the bottom cap member 84 is positioned around the neck portion 44 of the stub member 40 to hold the gear member 30 and the stub member 40 in place. The bottom cap member 84 has an opening 85 through which the stub member 40 extends. The flange 46 of the stub member 40 covers the opening 85 to prevent entry of foreign substances into the mechanism 14. The retaining members 86 in this embodiment each take the form of a spring positioned around the respective cap member 82, 84 to hold the cap member 82, 84 in place. As illustrated in FIG. 3, a portion of each retaining member 86 is received within an annular recess 87 in the cap member 82, 84, and a portion of each retaining member 86 is received within an annular recess 88 on the inner surface of the head 18. The retaining member 86 can be compressed into the recess 87 in the cap member 82, 84 in order to remove the cap member 82, 84 from the ratchet 10. In another embodiment, another type of retaining member may be used to hold the cap member 82, 84 in place, such as a threaded connection, a snap-fit connection, etc.

The gear member 30 is eccentrically positioned within the chamber 20, as shown in FIGS. 2-5. In other words, the axis of rotation 38 of the gear member 30 is offset from the central axis 19 of the chamber 20. Additionally, the pin 80 connects the gear member 30 eccentrically to the rotating member 50. The axis of rotation 51 of the rotating member 50 is substantially aligned with the central axis 19 of the chamber 20, and is also offset from the rotational axis 38 of the gear member 30. In one exemplary embodiment, the rotational axis 38 of the gear member 30 is offset 0.080 inch from the central axis 19 of the chamber 20 and the axis of rotation 51 of the rotating member 50. Thus, when the tool body 12 is rotated with respect to the stub member 40 (which is fixed when in use), the gear member 30 tends to rotate in the opposite direction. When rotation of the gear member 30 is not obstructed, such rotation causes the gear teeth 24, 32 to engage, causing the gear member 30 to travel around the gear surface 22 in an orbiting or revolutionary motion. In the embodiment shown in FIGS. 2-5, the gear member 30 generally orbits the central axis 19 of the chamber 20 and the axis of rotation 51 of the rotating member 50. Additionally, this orbiting motion of the gear member 30 exerts a moment on the rotating member 50 through the pin 80, due to the offset axes of rotation 38, 51, causing the rotating member to rotate in the direction of orbiting of the gear member 30. For example, as indicated in FIG. 4, when the tool body 12 is rotated in the counterclockwise direction, the gear member 30 rotates in the clockwise direction (arrow A). The clockwise rotation of the gear member 30 results in counterclockwise orbiting of the gear member 30 around the inside of the chamber 20. Viewed another way, the gear member 30 rolls around the inside of the gear surface 22, rotating in a clockwise direction while traveling in a counterclockwise direction. The counterclockwise orbiting of the gear member 30 causes the pin 80 to travel in a counterclockwise circle or orbit around the axis of rotation 51 of the rotating member, driving counterclockwise rotation of the rotating member 50 (arrow B). In the counterclockwise drive configuration shown in FIG. 5, the directions of movement of the gear member 30 and the rotating member 50 are reversed from those in the clockwise drive configuration of FIG. 4. This rotational relationship is described in greater detail below.

The stop member 60 and the rotating member 50 cooperate to selectively prevent rotation of the gear member 30 and stub member 40 in one direction, to lock the rotation mechanism 14. The mechanism by which the stop member 60 and the rotating member 50 cooperate to selectively prevent rotation of the gear member 30 and stub member 40 is illustrated in FIGS. 4 and 5. The rotating member 50 is positioned in the chamber 20 in one of two configurations. FIG. 4 illustrates the clockwise drive configuration, where the tool body 12 can freely rotate in the counterclockwise direction with respect to the gear member 30 and the stub member 40, but rotation of the tool body 12 in the clockwise direction is locked with respect to the gear member 30 and the stub member 40. FIG. 5 illustrates the counterclockwise drive configuration, where the tool body 12 can freely rotate in the clockwise direction with respect to the gear member 30 and the stub member 40, but rotation of the tool body 12 in the counterclockwise direction is locked with respect to the gear member 30 and the stub member 40.

In the clockwise drive configuration, shown in FIG. 4, the engagement member 56 of the rotating member 50 engages a first engagement surface 66 of the stop member 60. In this configuration, the rotating movement of the rotating member 50 causes the engagement member 56 to force the stop member 60 in the counterclockwise direction (indicated by arrow A) when the tool body 12 is rotated in the counterclockwise direction. Counterclockwise rotation of the tool body 12 causes clockwise rotation of the gear member 30 (arrow B), which causes the gear member 30 to orbit within the chamber 20 in the counterclockwise direction. Thus, the ratchet 10 can free-wheel when the tool body 12 is rotated in the counterclockwise direction. When the tool body 12 is rotated in the clockwise direction, the gear body 30 will in turn rotate in the counterclockwise direction and tend to orbit within the chamber in the clockwise direction. However, a first of the tapered arms 62 of the stop member 60 is in substantially immediate abutment with the journal 34, and an attempt to rotate the gear body 30 in the counterclockwise direction will compress the arm 62 of the stop member 60 between the journal 34 and the chamber wall 21, preventing movement of the gear member 30. Thus, the rotation mechanism 14 locks when the tool body 12 is rotated in the clockwise direction, and the ratchet 10 can be used to apply clockwise torque to an article connected to the stub member 40. The opening 85 of the bottom cap member 84 is of sufficient size to allow space for the orbiting motion of the gear member 30 and stub member 40, as shown in FIG. 3.

The counterclockwise drive configuration, illustrated in FIG. 5, the engagement member 56 of the rotating member 50 engages a second engagement surface 68 of the stop member 60. In this configuration, the rotating movement of the rotating member 50 causes the engagement member 56 to force the stop member 60 in the clockwise direction (indicated by arrow C) when the tool body 12 is rotated in the counterclockwise direction. Clockwise rotation of the tool body 12 causes counterclockwise rotation of the gear member 30 (arrow D), which causes the gear member 30 to orbit within the chamber 20 in the clockwise direction. Thus, the ratchet 10 can free-wheel when the tool body 12 is rotated in the clockwise direction. When the tool body 12 is rotated in the counterclockwise direction, the gear body 30 will in turn rotate in the clockwise direction and tend to orbit within the chamber in the counterclockwise direction. However, a second of the tapered arms 64 of the stop member 60 is in substantially immediate abutment with the journal 34, and an attempt to rotate the gear body 30 in the clockwise direction will compress the arm 64 of the stop member 60 between the journal 34 and the chamber wall 21, preventing movement of the gear member 30. Thus, the rotation mechanism 14 locks when the tool body 12 is rotated in the counterclockwise direction, and the ratchet 10 can be used to apply counterclockwise torque to an article connected to the stub member 40.

To adjust the rotating member 50 between the clockwise drive and counterclockwise drive configurations, the rotating member 50 is shifted so that the engagement member 56 engages the other of the two engagement surfaces 66, 68 of the stop member 60. In order to rotate the rotating member 50, the removable pin 80 must be removed to allow the rotating member 50 to rotate independently of the gear member 30. In the embodiment illustrated in FIGS. 2-5, the pin 80 is threaded into the hole 36 in the gear member 30, and the pin 80 has a knurled portion 81 to facilitate gripping of the pin 80 for inserting and removing the pin 80. In the embodiment illustrated in FIGS. 4 and 5, when shifting from the clockwise drive configuration (FIG. 4) to the counterclockwise drive configuration (FIG. 5), the pin 80 is removed and the rotating member 50 is rotated approximately 360° so that the engagement member 56 engages the second engagement surface 68 of the stop member 60. The rotation of the rotating member 50 to change the drive configuration also pushes the stop member 60 clockwise in FIGS. 4-5, so that the second arm 64 is positioned adjacent the journal 34 to enable quick engagement. Similarly, when shifting from the counterclockwise drive configuration (FIG. 5) to the clockwise drive configuration (FIG. 4), the pin 80 is removed and the rotating member 50 is rotated approximately 360° so that the engagement member 56 engages the first engagement surface 66 of the stop member 60. The rotation of the rotating member 50 to change the drive configuration also pushes the stop member 60 counterclockwise in FIGS. 4-5, so that the first arm 62 is positioned adjacent the journal 34 to enable quick engagement. After the rotation member 50 is in position, the pin 80 is re-inserted. The projection 58 of the rotation member 50 facilitates manual manipulation of the rotation member 50 in accomplishing this shifting.

FIGS. 6-9 illustrate a second embodiment of a ratchet 110, which contains many of the same components as the ratchet 10 described above and shown in FIGS. 1-5. Thus, the ratchet 110 is described below mostly with respect to its differences from the ratchet 10 of FIGS. 1-5. To the extent that the ratchet 110 contains components that are the same or similar to those already described with respect to the ratchet 10 of FIGS. 1-5, the same reference numerals are used in FIGS. 6-9.

The rotating mechanism 114 of the ratchet 110 of FIGS. 6-9 contains a stop member 160 that is different from the stop member 60 in FIGS. 1-5. The stop member 160 does not contain the post 67 as shown in FIGS. 4-5, and instead contains a spring 165 that defines the engagement surfaces 166, 168. Each of the engagement surfaces 166, 168 is defined at one of the opposed ends of the spring 165. In the embodiment shown, the spring 165 is received within a recess 163 in the body of the stop member 160 and is held within the recess by the cap member 82. In operation, the engagement member 56 of the rotating member 50 engages one of the two engagement surfaces 166, 168 of the stop member 160 in the same manner as described above with respect to the engagement surfaces 66, 68. The stop member 160 otherwise has a wedge-shaped structure with opposed arms 62, 64, similar to the stop member 60 described above, and functions otherwise similarly to the stop member 60 described above. The use of the spring 165 can assist in keeping tension on the stop member 160 to improve quick engagement and locking between the stop member 160 and the journal 34.

In other embodiments, still further configurations of stop members may be used, and such stop members can have different structures defining the engagement surfaces. For example, a stop member may have a different type or configuration of spring, a plurality of separate posts, or an insert made of polymer, foam, metal, composite, etc., to define the engagement surfaces, among other possibilities.

The configuration of the ratchet 10 described above provides a substantially stepless locking engagement between the tool body 12 and the stub member 40. As illustrated in FIGS. 4 and 5, one of the arms 62, 64 of the stop member 60 remains in substantially continuous and immediate abutment with the journal 34 of the gear member 30 throughout the range of orbiting movement of the gear member 30. Consequently, any rotation of the tool body 12 in the locking direction will cause immediate engagement of the journal 34 and the stop member 60 and immediate locking of the rotation mechanism 14 of the ratchet 10. The designs of prior ratchet devices prevent this immediate locking of the rotation mechanism 14, and prior ratchet devices have a certain degree of "play" before rotation of the handle will apply torque to a tool connected to the stub member. This limits the use of these prior ratchets in confined spaces. In one exemplary embodiment of the ratchet 10 described herein, the ratchet 10 can lock and apply torque through the stub member 40 in a total range of rotation of 2° or less, and in one embodiment, the ratchet can lock in a total range of rotation of 1°-1.5°. The maintained close proximity between the journal 34 and the arm 62, 64 of the stop member 60, 160 and between the outer surface 61 of the stop member 60, 160 and the chamber wall 21 assists in quick locking of the mechanism. Thus, the ratchet 10 can be used in smaller confined spaces than prior ratchets.

The embodiments of the rotation mechanisms described herein also provide other advantages over prior designs. For example, the locking engagement between the stop member and the gear member prevents gradual slippage of the internal mechanisms of the ratchet. As another example, some prior rotation mechanisms have tended to "lock up" at high levels of torque, and the features of the rotation mechanism can prevent this from occurring. As a further example, some prior rotation mechanisms have attempted to use a stopping mechanism that engages or interlocks with internal gear teeth in the mechanism, which can deform the gear teeth. The stop member described herein can avoid this problem because it does not engage the gear teeth, but rather, engages a smooth cylindrical surface of the chamber. Still further, the rotation mechanism can produce smoother free-wheeling action than existing rotation mechanisms. When used in a socket wrench, for example, the mechanism would exert less force on a nut or other fastener during free-wheeling, reducing the chance that the fastener would move with the wrench instead of remaining in place. It is understood that aspects and features of the rotation mechanisms described herein are not limited to socket wrenches or other hand tools, and can be used in other types of ratchet mechanisms or other locking mechanisms for achieving one-directional motion.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," "clockwise," "counterclockwise," etc., as used herein, are intended for illustrative and reference purposes only and do not limit the embodiments in any way. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A ratchet mechanism comprising:
   a circular chamber defined by at least one substantially annular gear surface having a plurality of gear teeth thereon;
   a rotating member positioned at least partially within the chamber, the rotating member comprising a rotatable body having a first center of rotation and an engagement member connected to the body;
   a gear member rotatably attached to the rotating member and positioned at least partially within the chamber, the gear member having a second center of rotation that is parallel to and axially offset from the first center of rotation, the gear member comprising a gear body having a plurality of gear teeth around an outer periphery thereof, at least a portion of the gear teeth engaging the gear surface; and
   a stop member comprising a body having an engagement surface thereon, wherein the engagement member of the rotating member engages the engagement surface of the stop member such that the rotating member and the stop member move in unison,
   wherein the gear member can rotate freely in a first rotational direction and a portion of the stop member abuts a portion of the gear member to prevent rotation of the gear member in a second, opposed rotational direction.

2. The ratchet mechanism of claim 1, wherein the gear member rotatably engages the rotating member such that the offset of the first and second centers of rotation causes the gear member to orbit the first center of rotation when the gear member is rotated.

3. The ratchet mechanism of claim 1, wherein when the gear member is rotated in the first rotational direction, the rotating member rotates in the second, opposed rotational direction.

4. The ratchet mechanism of claim 1, wherein the gear member further comprises an integral stub member projecting from the gear member and adapted to be attached to a tool attachment.

5. The ratchet mechanism of claim 1, wherein the rotating member has a first position and a second position relative to the stop member, wherein when the rotating member is in the first position, the rotating member engages a first surface of the stop member to cause the stop member to move in a first direction around the chamber, and when the rotating member is in the second position, the rotating member engages a second surface of the stop member to cause the stop member to move in a second direction around the chamber.

6. The ratchet mechanism of claim 5, wherein the rotating member is adjustable between the first and second positions relative to the stop member by rotating the rotating member relative to the stop member.

7. The ratchet mechanism of claim 5, further comprising a removable pin connecting the rotating member to the gear member, wherein the removable pin is removable to adjust the rotating member between the first position and the second position relative to the stop member.

8. The ratchet mechanism of claim 5, wherein the stop member further comprises a spring, wherein the first surface of the stop member is located at a first end of the spring and the second surface of the stop member is located at a second end of the spring.

9. The ratchet mechanism of claim 8, wherein the stop member comprises a body having a recess therein and the spring is received within the recess.

10. The ratchet mechanism of claim 1, wherein the gear member has a journal located adjacent the gear body, the stop member abutting the journal to prevent rotation of the gear member in the second direction.

11. The ratchet mechanism of claim 10, wherein the chamber comprises a lower portion including the gear surface and an upper portion including a smooth, cylindrical chamber wall,
    wherein at least a portion of the journal and at least a portion of the stop member are located within the upper portion, and
    wherein when the journal abuts the stop member to prevent rotation of the gear member, the journal compresses an arm of the stop member between the journal and the chamber wall.

12. A ratchet mechanism comprising:
    a circular chamber defined by at least one substantially annular gear surface having a plurality of gear teeth thereon;
    a rotating member positioned at least partially within the chamber, the rotating member comprising a rotatable body and an engagement member connected to the body;
    a gear member rotatably engaging the rotating member such that the gear member and the rotating member rotate simultaneously in opposite rotational directions, the gear member positioned at least partially within the chamber, the gear member comprising a gear body having a plurality of gear teeth around an outer periphery thereof, at least a portion of the gear teeth engaging the gear surface; and
    a stop member comprising a body having an engagement surface thereon, wherein the engagement member of the rotating member engages the engagement surface of the stop member such that the rotating member and the stop member move in unison,
    wherein the gear member can rotate freely in a first rotational direction, and the stop member abuts a portion of the gear member to prevent rotation of the gear member in a second, opposed rotational direction.

13. The ratchet mechanism of claim 12, wherein the gear member rotatably engages the rotating member such that the rotating member and the gear member have parallel and axially offset centers of rotation.

14. The ratchet mechanism of claim 13, wherein the offset centers of rotation of the gear member and the rotating member cause the gear member to orbit the center of rotation of the rotating member when the gear member is rotated in the first rotational direction.

15. The ratchet mechanism of claim 12, wherein the gear member further comprises an integral stub member projecting from the gear member and adapted to be attached to a tool attachment.

16. The ratchet mechanism of claim 12, wherein the rotating member has a first position and a second position relative to the stop member, wherein when the rotating member is in the first position, the rotating member engages a first surface of the stop member to cause the stop member to move in a first direction around the chamber, and when the rotating member is in the second position, the rotating member engages a second surface of the stop member to cause the stop member to move in a second direction around the chamber.

17. The ratchet mechanism of claim 16, wherein the rotating member is adjustable between the first and second positions relative to the stop member by rotating the rotating member relative to the stop member.

18. The ratchet mechanism of claim 16, further comprising a removable pin connecting the rotating member to the gear member, wherein the removable pin is removed to adjust the rotating member between the first position and the second position relative to the stop member.

19. The ratchet mechanism of claim 16, wherein the stop member further comprises a spring, wherein the first surface of the stop member is located at a first end of the spring and the second surface of the stop member is located at a second end of the spring.

20. The ratchet mechanism of claim 19, wherein the stop member comprises a body having a recess therein and the spring is received within the recess.

21. The ratchet mechanism of claim 12, wherein the gear member has a journal located adjacent the gear body, the stop member abutting the journal to prevent rotation of the gear member in the second direction.

22. The ratchet mechanism of claim 21, wherein the chamber comprises a lower portion including the gear surface and an upper portion including a smooth, cylindrical chamber wall,
wherein at least a portion of the journal and at least a portion of the stop member are located within the upper portion, and
wherein when the journal abuts the stop member to prevent rotation of the gear member, the journal compresses an arm of the stop member between the journal and the chamber wall.

23. A ratchet mechanism comprising:
a chamber defined by a substantially annular fixed gear surface, the fixed gear surface having a plurality of gear teeth thereon;
a rotating member positioned at least partially within the chamber, the rotating member comprising a rotatable body and an engagement member connected to the body;
an integral gear member rotatably attached to the rotating member and positioned at least partially within the chamber, the gear member comprising a gear body having a plurality of gear teeth around an outer periphery thereof and an integral stub member projecting from a first surface of the gear body, at least a portion of the gear teeth engaging the gear surface; and
a stop member comprising a body having an engagement surface thereon, wherein the engagement member of the rotating member engages the engagement surface of the stop member such that the rotating member and the stop member move in unison,
wherein the gear member can rotate freely in a first rotational direction and a portion of the stop member abuts a portion of the gear member to prevent rotation of the gear member in a second, opposed rotational direction.

24. The ratchet mechanism of claim 23, wherein the gear member further comprises an integral journal located adjacent the gear body, the stop member abutting the journal to prevent rotation of the gear member in the second direction, wherein the journal projects from a second surface of the gear body, opposite the first surface.

25. A hand tool comprising:
a tool body having a handle and a head mounted at an end of the handle, the head having a circular chamber therein;
a fixed gear surface located around an inner circumference of the circular chamber and having a plurality of gear teeth thereon;
a rotating member positioned within the chamber and having a first center of rotation, the rotating member comprising a horizontal plate having a passage therethrough and having an engagement member extending therefrom;
a gear member positioned within the chamber and rotatably attached to the rotating member, the gear member having a second center of rotation that is parallel to and axially offset from the first center of rotation, the gear member comprising a substantially circular gear body having a plurality of gear teeth around an outer circumference thereof, a journal projecting from a first side of the gear member and having a threaded hole therein, and a stub member projecting from a second side of the gear member and adapted to be attached to a tool attachment, wherein a portion of the plurality of gear teeth of the gear member engage a portion of the plurality of gear teeth of the fixed gear surface;
a stop member having a first engagement surface and a second engagement surface, the rotating member being adjustable between a first configuration, wherein the engagement member engages the first engagement surface of the stop member so that the rotating member and the stop member move in unison in a first direction, and a second configuration, wherein the engagement member engages the second engagement surface of the stop member so that the rotating member and the stop member move in unison in a second direction; and
a removable pin extending through the passage in the rotating member and threadably engaging the threaded hole in the gear member to rotatably attach the rotating member to the gear member, wherein the pin is removable to permit adjustment of the rotating member between the first configuration and the second configuration,
wherein when the rotating member is in the first configuration, the stub member can rotate freely relative to the tool body in a clockwise direction and the journal abuts the stop member to prevent rotation of the stub member relative to the tool body in a counterclockwise direction, and when the rotating member is in the second configuration, the stub member can rotate freely relative to the tool body in the counterclockwise direction and the journal abuts the stop member to prevent rotation of the stub member relative to the tool body in the clockwise direction.

26. The hand tool of claim 25, wherein the gear member is rotatably mounted on the rotating member such that the offset of the first and second centers of rotation causes the gear member to orbit the first center of rotation when the rotating member is rotated.

27. The hand tool of claim 25, wherein the rotating member is rotated with respect to the stop member to adjust the rotating member between the first configuration and the second configuration.

28. The hand tool of claim 25, further comprising:
a first cap member positioned over a first end of the circular chamber, the first cap member having an aperture therein, wherein at least a portion of the rotating member is received within the aperture, the aperture further providing access to the removable pin;

a second cap member positioned over a second, opposed end of the circular chamber, the second cap member having an aperture therein, wherein the stub member extends through the aperture;

means for retaining the first cap member to the head; and means for retaining the second cap member to the head.

29. The ratchet mechanism of claim 25, wherein the stop member further comprises a spring, wherein the first surface of the stop member is located at a first end of the spring and the second surface of the stop member is located at a second end of the spring.

30. The ratchet mechanism of claim 29, wherein the stop member comprises a body having a recess therein and the spring is received within the recess.

31. The hand tool of claim 25, wherein the chamber comprises a lower portion including the fixed gear surface and an upper portion including a smooth, cylindrical chamber wall, wherein at least a portion of the journal and at least a portion of the stop member are located within the upper portion and at least a portion of the gear body is located within the lower portion, and wherein when the journal abuts the stop member to prevent rotation of the stub member relative to the tool, the journal compresses an arm of the stop member between the journal and the chamber wall.

* * * * *